(No Model.)

R. H. L. & E. TALCOTT.
MOUNT FOR PICTURES AND PHOTOGRAPHS.

No. 338,651. Patented Mar. 23, 1886.

Witnesses:
Mary A. Talcott
Wm. L. Bellows

Inventors:
Richard H. L. Talcott
Elizabeth Talcott

N. PETERS, Photo-Lithographer, Washington, D. C.

UNITED STATES PATENT OFFICE.

RICHARD H. L. TALCOTT AND ELIZABETH TALCOTT, OF BOSTON, MASS.

MOUNT FOR PICTURES AND PHOTOGRAPHS.

SPECIFICATION forming part of Letters Patent No. 338,651, dated March 23, 1886.

Application filed July 18, 1885. Serial No. 171,927. (No model.)

*To all whom it may concern:*

Be it known that we, RICHARD H. L. TALCOTT and ELIZABETH TALCOTT, of Boston, in the county of Suffolk and State of Massachusetts, have invented certain new and useful Improvements in Mounted Pictures, Photographs, &c., of which the following is a full, clear, and exact description.

This invention relates to a mounted picture—such, for instance, as a photograph—the objects thereof being to so mount the picture as to dispense with the ordinary picture-frame, to preserve the picture, and secure a stronger, richer, more brilliant, and more life-like picture than has been heretofore produced by ordinary modes of mounting such pictures, and to afford, when so mounted, means for suspension of the same or for support of the same, as described; and to these ends the invention consists, first, in the combination, with a sheet bearing a picture, of a sheet or plate of glass or other transparent substance suitable, said picture being secured to one side of said sheet of glass, and the whole provided with a covering or casing suitably secured thereto, inclosing the back side of the picture and extended to lap the front edge of the glass and connected thereto, leaving the picture exposed to view at the front side thereof, all substantially as hereinafter described.

It further consists in a mounted picture consisting of a picture having its face cemented to a glass or transparent front, a suitable covering to the back of the picture and glass, and a flexible material attached to the backing and extended across the edges of the covering and glass, and lapped over and cemented to the face of the front, as hereinafter described and claimed.

It also consists in the combination, with a sheet bearing a picture, of a sheet of glass or other transparent substance suitable, and the whole provided with a covering or casing suitably secured thereto at the back side of the same and in a manner to leave the picture exposed at the front thereof, and a sheet or sheets of card-board or similar material behind the picture and having between them a plate provided with rings or eyes or hooks or other projections, said eyes or projections extending to the outside thereof, all substantially as hereinafter shown, and for the purpose described.

It also consists in other features in detail, as will hereinafter be pointed out.

Figure 1:
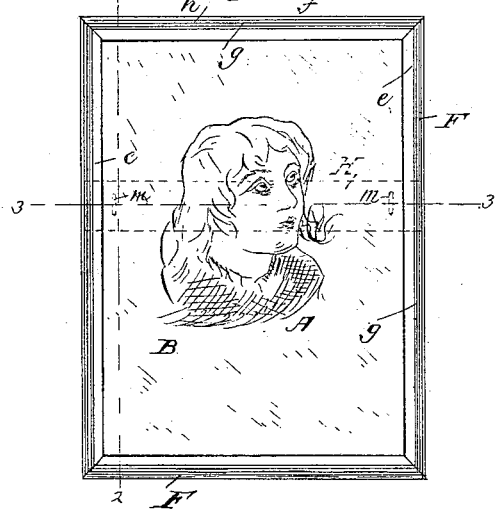
Figure 2:
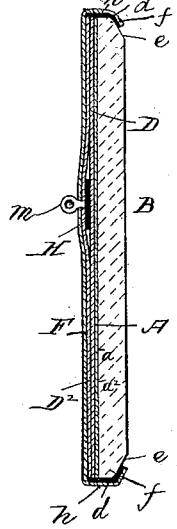
Figure 3:
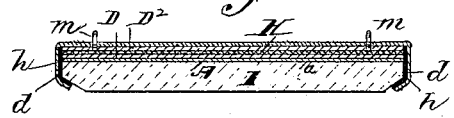
Figure 4:
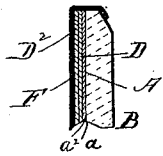
Figure 5:
Figure 7:
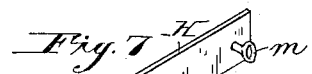
Figure 6:
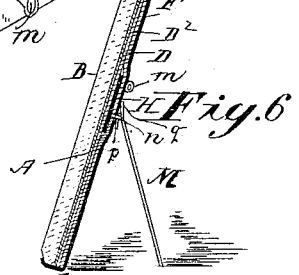
Figure 8:

In the accompanying sheets of drawings, Figure 1 is a front view of a picture mounted. Fig. 2 is a longitudinal section of Fig. 1 on line 2 2. Fig. 3 is a cross-section of Fig. 1 on line 3 3. Fig. 4 is a view in detail showing a modified arrangement. Fig. 5 is a perspective view of the plate having the eyes or projections. Fig. 6 is a vertical sectional view of a mounted picture and a support therefor; Figs. 7 and 8, perspective and sectional views of parts employed in the use of the picture as illustrated in Fig. 6.

In the drawings, A represents a picture—such, for instance, as the albumenized skin or layer, simply. This sheet or layer A, constituting the picture, is deposited on the back side, $a$, of a plate of glass, B, or other suitable transparent material, and is made to adhere thereto in a close and firm manner throughout its entire surface by a suitable adhesive material which is transparent.

The face $a^2$ of the layer A, on which is the configuration or picture, is placed toward and against the back $a$ of the plate of glass B, and is visible and exposed to view from the front of same.

A sheet or sheets, D D$^2$, of card-board or other more or less stiff sheet material, is placed behind the picture, affording a body and protection to the same.

The sheets D D$^2$ are preferably of an area the same as that of the plate of glass B, as they are confined in place and secured to the plate of glass by strips $d$ $d$, of flexible sheet material — such as leather — which strips $d$ $d$ are of a width to extend across the combined edges of the card or cards D D$^2$ and the plate of glass B with the picture A, and to overlap on the front face, $e$, of such plate of glass a short distance from its edge $f$, which may, if desired, be beveled. The parts constituting the picture and its mountings are thus held together quite firmly; but for additional security, and to secure as well a neat and tasteful appearance, a sheet of suitable flexible material, F—such, for instance, as leather—is placed over the back of the picture or cemented to the back of the card D², and by its edges h made to overlap the edges f of the mounted picture, as at g, and to overlap the front face, e, being firmly secured by an adhesive material to the strips d d.

The strips d d, of flexible material, may, if desired, be dispensed with, and the edges h of the backing or covering sheet F may be directly secured to the edges of the cards D D² and the plate of glass B, carrying the picture A, and to overlap the front face, e, for a portion thereof and cemented thereto, as seen in detail in Fig. 4; but it is preferable to employ the strips d d d d substantially as above described, and as shown in Figs. 2 and 3, as greater durability and strength are thus secured.

For the purpose of suspending a picture mounted as above described, a thin sheet, H, of metal or other material, carrying rings or eyes m, is placed behind the sheet D or between the sheets D D², and the eyes or rings or projections m extend through the thickness of the rearmost of such sheets D D², and through the incasing or covering sheet F, and protrude beyond the surface of the same, and are in position for engagement with a hanging cord or wire, &c., all as obvious. This sheet or plate of metal H is preferably of a length corresponding with the width of the backing-card D D, and is of any suitable width, but of a width less than the length of said cards D D², and when placed between them in a manner and position as shown in Fig. 2 the surface of the cards or boards D D² beyond or above and below the edges of said metal plate are secured or made to adhere the one to the other by any suitable cement. Thus the hanging-plate H is firmly incorporated in the mounting of the picture, and is capable of sustaining through its rings, eyes, or other suitable projections, m, the weight of a very heavy mounting, as is obvious, and at the same time is simple, cheap, and is not unsightly.

To increase the susceptibility of the picture to an extent that it may at one and the same time be suspended, as above described, and also be supported in a more or less oblique position, after the manner of an easel-support, the plate H is provided with a projection, which may be, as shown at n, in the form of an eye, and which, when the said plate H is incorporated in the mounting of the picture, as hereinabove described, extends and protrudes beyond the outer back surface of the inclosing-sheet similarly to the projections or eyes m m; but it is preferably as shown in Figs. 6 and 7, and a leg or support, M, engages with such eye n in any suitable manner. As particularly shown in Figs. 6 and 8, such leg M has a hook or pin, p, which enters said eye n, making the engagement and connection, and the leg has also an upward extension, q, at more or less of an angle to the general direction of such leg or support M, which limits the inclination of the picture, as evident. (See Figs. 6 and 8.) This leg may be of plate metal suitably bushed or covered to protect same against injuring whatever it comes in contact with; or it may be wire suitably bent to form such a leg or support. This leg-support, when the picture is desired to be suspended, can lie closely against the back of same, and not interfere with its hanging in the least.

It will be remarked that the advantages of mounting pictures in the manner set forth are, that the picture, being made to adhere to the glass closely and firmly, is free from wrinkles and cannot warp, and the effect of the glass by such an adhesion of the picture thereto is a very great improvement in the effect, giving the picture a surprising strength, softness, richness, brilliancy, and life-like appearance, and overcoming the flat and inartistic effect common in pictures otherwise mounted, and thus inferior pictures, photographs, &c., are made into very satisfactory, acceptable, and desirable articles of "virtu."

The picture, if a photograph or other similar production, is preserved from fading, being, as it were, hermetically sealed.

The glass used in the mounting described is preferably of considerable thickness and perfectly clear, and is also preferably beveled at the edge, affording opportunity for a better finish; but at the same time it need not be so beveled, and said plates may be of any shape desired, and may have either plane and flat faces, as illustrated, or may be concave or convex, or a more or less approach to a basin or spherical shape, in which cases the parts going to make up the mounting conform to such shapes.

Leather is very desirable as the inclosing or incasing sheet material; but other sheet material may be used—as, for instance, "leatherette," so called, or "leatheroid," so called, which is a product from paper-pulp very much resembling leather, and which could be put on while in a plastic or flexible condition, and allowed to harden and become rigid. Sheet metal might also be employed, and the said inclosing-covering may, if desired, be struck up or embossed with any desired design or configuration.

The picture thus mounted has much neatness of appearance, and, to many tastes, is preferable to a frame mounting. Still, there is nothing to prevent it being inclosed by an ordinary picture-frame and secured therein, if desired.

Although it is best to use two sheets, D D², of card-board, with the ring-plate H between them confining same, as one with same, only one sheet may be used, the said plate being confined to one or the other side thereof; or it could be secured to the inner side of the inclosing-sheet F.

Having thus described our invention, we claim—

1. The mounted picture herein described, the same consisting of a picture having its face cemented to a transparent front, a suitable covering to the back of the picture and transparent front, and a flexible material attached to the backing and extended across the edges of the covering and transparent front, and cemented to the face of the latter, substantially as and for the purposes described.

2. The mounted picture herein described, the same consisting of a picture-sheet and a plate of glass, the picture by its front face cemented to the glass, and provided with an inclosing-casing of suitable flexible material, which covers the back of the picture and overlaps and is cemented to the glass at its edges, all substantially as described, and for the purposes specified.

3. The combination, with a sheet bearing a picture, of a plate of glass, sheet or sheets D D², of card or paste board, and a plate having rings or eyes $m$ between them, and an incasing or covering sheet of suitable flexible material inclosing the whole at the back and edges, leaving the front exposed, said rings of the plate protruding through the card-sheet D² and covering-sheet, substantially as described, for the purpose specified.

4. The combination, with a sheet bearing a picture, of a plate of glass, said picture-sheet being made to adhere to one side of said glass sheet or sheets D D², of card or paste board, and a plate having eyes or rings $m$ between them, and an incasing or covering sheet of suitable flexible material inclosing the whole at the back and edges, leaving the front exposed, said rings of the plate protruding through the card-sheet D² and covering-sheet, substantially as described, for the purpose specified.

5. The combination, with a sheet bearing a picture, of a plate of glass, sheet or sheets D D², of card or paste board, and a plate having rings or eyes $m\ m$ and $n$ between them, and an incasing or covering sheet of suitable flexible material inclosing the whole at the back and edges, leaving the front exposed, said rings of the plate protruding through the card-sheet D² and covering-sheet, and a leg or support, M, engaging with said projection $n$, substantially as described, for the purpose specified.

6. The combination, with a sheet bearing a picture, of a plate of glass, sheet or sheets D D², of card or paste board, and a plate, H, between them, with a projection, and an inclosing or covering sheet of suitable material inclosing the whole at the back and edges, leaving the front exposed, the said projection from the plate protruding through the card-sheet D² and inclosing-sheet, and adapted to be attached to suitable means for supporting the mounted picture, substantially as described.

In testimony whereof we have hereunto set our hands in the presence of two subscribing witnesses.

RICHARD H. L. TALCOTT.
ELIZABETH TALCOTT.

Witnesses:
  MELINDA E. TALCOTT,
  WM. S. BELLOWS.